March 12, 1968

G. R. PRESCOTT ET AL 3,372,916

APPARATUS FOR STRESS-RELIEVING PIPE WELDS

Filed Sept. 21, 1965

GEORGE ROBERT PRESCOTT
HAROLD WILSON SHARP
INVENTORS

BY Lyon & Lyon

ATTORNEYS

# United States Patent Office 3,372,916
Patented Mar. 12, 1968

3,372,916
APPARATUS FOR STRESS-RELIEVING PIPE WELDS
George Robert Prescott, Pasadena, and Harold Wilson Sharp, Whittier, Calif., assignors to C. F. Braun & Co., Alhambra, Calif., a corporation of California
Filed Sept. 21, 1965, Ser. No. 489,102
2 Claims. (Cl. 266—2)

ABSTRACT OF THE DISCLOSURE

Stress-relieving of a welded joint in a horizontal pipe is accomplished by two series of radiant heaters encircling the pipe, one series on each side of the welded joint. Duplicate hinged ring segments support the radiant heaters and supply combustible gas to them. Laterally spaced pipe-engaging means on the ring segments position the radiant heaters in an eccentric position with respect to the pipe, and upwardly diverging annular wind screens positioned between the pipe-engaging elements encircle the pipe and confine the radiant heaters between them.

---

This invention relates to the heat treatment of metallic structures, and is particularly directed to heating apparatus for stress relief of pipe welds under field conditions.

Butt welds joining ends of large diameter pipe are difficult to stress relieve properly under field conditions because uniformity of heating and slow cooling are difficult to achieve. It is the principal object of this invention to provide improved apparatus for obtaining these desired results in a superior manner.

Briefly stated, this object is achieved by providing a pair of hollow arcuate ring sections each carrying axially spaced pairs of radiant heaters, the radiant heaters encompassing the pipe ends on opposite sides of the weld. Other and more detailed objects and advantages will appear hereinafter.

In the drawings, FIGURE 1 is an end elevation showing a preferred embodiment of this invention in position around a pipe weld, and taken in the direction of the lines 1—1 as shown on FIGURE 2.

Figure 1:
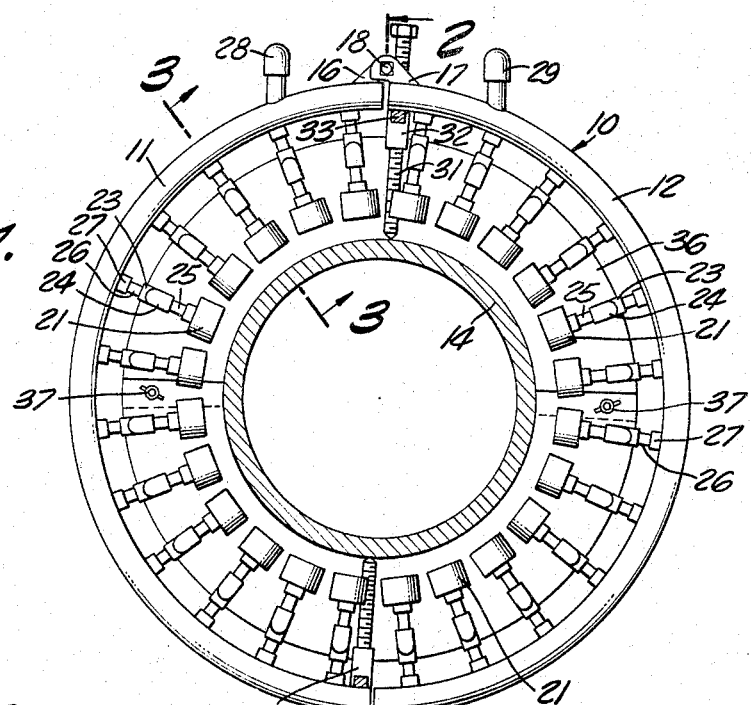
Figure 2:
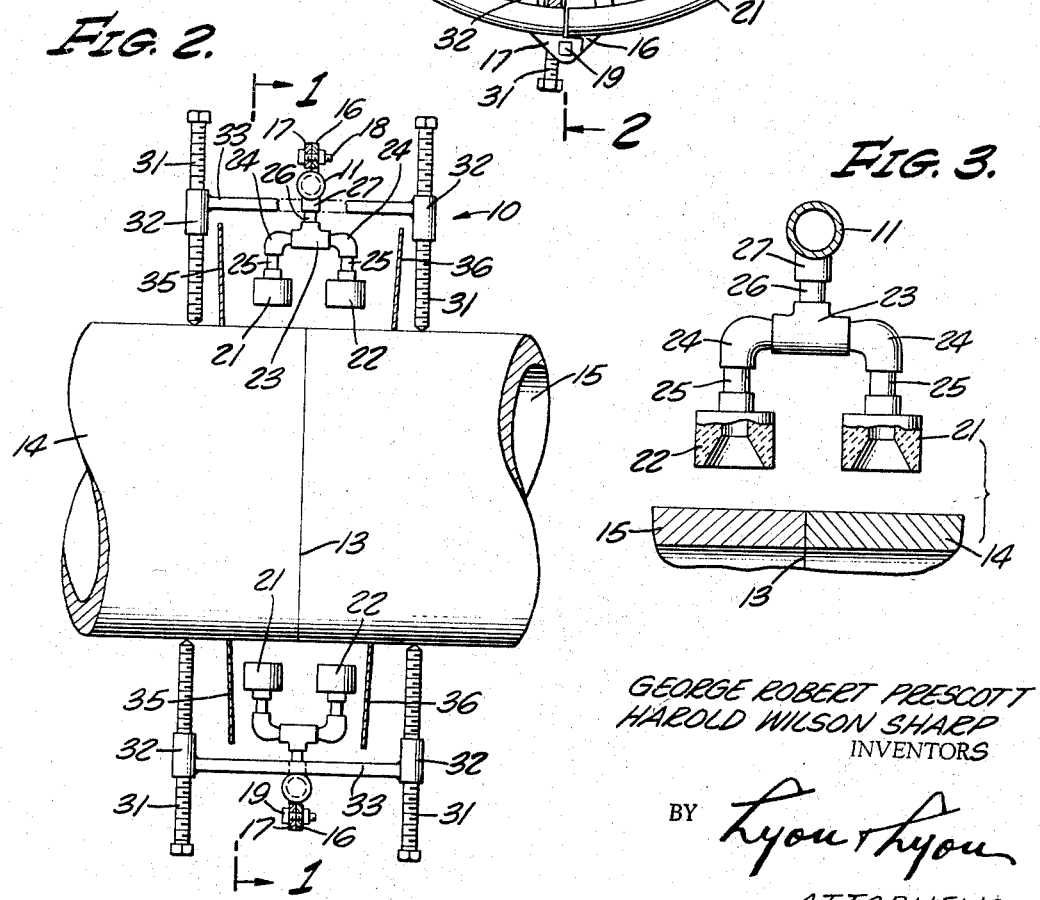
FIGURE 2 is a side elevation taken substantially on lines 2—2 as shown on FIGURE 1.
Figure 3:
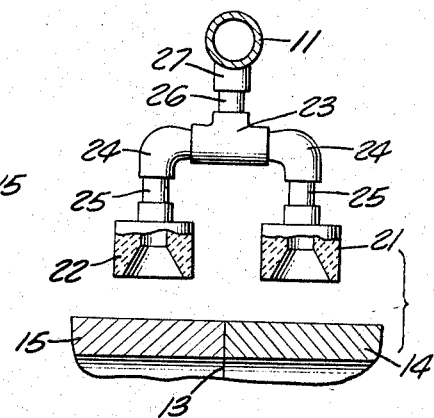
FIGURE 3 is a sectional detail taken substantially on the lines 3—3 as shown on FIGURE 1.

Referring to the drawings, the stress relief apparatus generally designated 10 includes a pair of hollow arcuate ring sections 11 and 12 cooperating to encircle a pipe weld 13 joining aligned pipe ends 14 and 15. Each ring section 11, 12 comprises a tube bent into a semi-circle and closed at both ends. Aligned tabs 16 and 17 at the ends of the ring sections are connected by bolts 18 and 19 which extend axially of the pipe. Removal of either bolt permits the ring sections to swing about the other bolt as a hinge, thus affording a means for applying the apparatus 10 laterally to the weld 13. The ring sections 11 and 12 are duplicates.

Pairs of radiant heaters 21 and 22 are supported on each of the ring sections 11 and 12 to encompass the pipe ends 14 and 15 on opposite sides of the butt weld 13. Each radiant heater is mounted substantially radial to the pipe, and each pair is carried on a T fitting 23 by means of an elbow 24 and nipple 25. Each T fitting is connected to its respective ring section by means of appropriate fittings 26 and 27. Combustible gas supplied through inlet fittings 28 and 29 to the hollow interior of each ring section 11, 12 reaches the radiant heaters 21, 22 through the T fittings 23.

Each of the radiant heaters 21, 22 comprises a ceramic burner cup which beams radiant heat against the outer cylindrical surfaces of the pipe without flame impingement. The inner contour of each cup is such that its surface is "washed" by hot combustion products, becoming highly incandescent. The heating rate is readily controlled by connection means varying the fuel-air mixture admitted through inlet fittings 28 and 29. The fuel-air ratio has a wide tolerance and is properly adjusted when the air flow is just below the point causing a visible flame cone beyond the cup.

The apparatus 10 is supported in position on the pipe by means of jack screws 31 extending through internally threaded collars 32 carried on axially extending bars 33. One bar is fixed to each ring section. The radiant heaters and ring sections are not concentric to the pipe in horizontal position, but on the contrary are positioned by means of the jack screws 31 so that the lowermost radiant heaters are closer to the pipe surface than the uppermost radiant heaters. For example, when stress relieving a weld in 14-inch diameter pipe, the radiant heaters were spaced about ¾ inch from the pipe surface at the bottom and about 1¼ inch at the top. The reason for this unequal spacing is to obtain uniform heating; the heated combustion products tend to rise by compensating for the pressure and thereby contribute to heating the upper part of the pipe. The off-center spacing compensates for this effect. Fuel in this example was bottled propane mixed with air.

When stress relieving vertical pipe, the radiant heaters are positioned concentric with the pipe.

Split annular wind screens 35 and 36 encircle the pipe ends 14 and 15 and pass between the jack screws 31 and the radiant heaters 21, 22. The parts of each wind screen are held together by suitable clamp fastenings 37, as shown in FIGURE 1. In order to obtain uniform heating in spite of rising products of combustion, the wind screens are not parallel, but diverge upwardly. In the example given above, the wind screens are positioned about ½ inch from the radiant heaters at the bottom and about 2½ inches from them at the top.

Temperature control is achieved by conventional means, such as the use of "tempilstiks" which constitute crayon-like materials which melt at a specified temperature. Marking of the pipes with two such materials prior to heating furnishes a visual indication that the metal temperature is within the desired range.

Slow cooling after the required time at temperature is achieved by gradually reducing the heating rate or by covering the stress-relief area with asbestos blankets or other insulation.

Having fully described our invention, it is to be understood that we do not wish to be limited to the details herein set forth or to the details illustrated in the drawings, but our invention is of the full scope of the appended claims.

We claim:
1. In a device for stress relieving a welded joint in a horizontal pipe, the combination of: hollow arcuate ring segments cooperable to encircle a pipe, axially spaced pairs of radiant heaters mounted on each ring segment and directed substantially radial to the pipe surface, said spaced pairs forming a first series of radiant heaters on one side of the welded joint and a second series on the other side, means for supplying a combustible gas to each radiant heater through its respective ring segment, laterally spaced pipe-engaging elements for positioning the radiant heaters with respect to the pipe, and a pair of annular wind screens encircling the pipe between said pipe-engaging elements and confining the radiant heaters between them, the wind screens diverging upwardly.

2. In a device for stress relieving a welded joint in a horizontal pipe, the combination of: hollow arcuate ring segments cooperable to encircle a pipe, axially spaced pairs of radiant heaters mounted on each ring segment and directed substantially radial to the pipe surface, said spaced pairs forming a first series of radiant heaters on one side of the welded joint and a second series on the other side, means for supplying a combustible gas to each radiant heater through its respective ring segment, axially extending bars on said ring segments, laterally spaced jack screws on the bars engageable with the pipe for positioning the radiant heaters in an eccentric position with respect to the pipe, and a pair of annular wind screens encircling the pipe between said jack screws and confining the radiant heaters between them, the wind screens diverging upwardly.

References Cited

UNITED STATES PATENTS

| | | | |
|---|---|---|---|
| 1,053,913 | 2/1913 | Hauck | 263—5 |
| 2,006,001 | 6/1935 | Rowe et al. | 263—5 |
| 2,085,790 | 7/1937 | Campbell. | |
| 2,214,031 | 9/1940 | Rockefeller | 263—5 |
| 2,296,387 | 9/1942 | Inskeep et al. | 266—5 |
| 2,589,778 | 3/1952 | Corns | 263—4 |
| 2,593,295 | 4/1952 | Granfield | 263—5 XR |
| 2,634,633 | 4/1953 | Smith | 158—27.4 |
| 3,088,515 | 5/1963 | Fagan | 158—107 |

J. SPENCER OVERHOLSER, *Primary Examiner.*

R. S. ANNEAR, *Assistant Examiner.*